United States Patent
Lee et al.

(10) Patent No.: US 11,804,648 B2
(45) Date of Patent: Oct. 31, 2023

(54) BACK COVER WITH AN ANTENNA ELEMENT

(71) Applicant: Cheng Uei Precision Industry Co., Ltd., New Taipei (TW)

(72) Inventors: James Cheng Lee, La Habra, CA (US); Kuo Yang Wu, New Taipei (TW); Lin Yean Lin, New Taipei (TW); Kuo Wei Chang, New Taipei (TW); Yu Chin Huang, New Taipei (TW)

(73) Assignee: Cheng Uei Precision Industry Co., Ltd., New Taipei (TW)

(*) Notice: Subject to any disclaimer, the term of this patent is extended or adjusted under 35 U.S.C. 154(b) by 363 days.

(21) Appl. No.: 17/382,088

(22) Filed: Jul. 21, 2021

(65) Prior Publication Data

US 2022/0166128 A1 May 26, 2022

Related U.S. Application Data

(60) Provisional application No. 63/116,995, filed on Nov. 23, 2020.

(51) Int. Cl.
| | |
|---|---|
| *H01Q 1/24* | (2006.01) |
| *H01Q 1/36* | (2006.01) |
| *H01Q 1/46* | (2006.01) |
| *H04M 1/02* | (2006.01) |

(52) U.S. Cl.
CPC .......... *H01Q 1/243* (2013.01); *H01Q 1/36* (2013.01); *H01Q 1/46* (2013.01); *H04M 1/026* (2013.01)

(58) Field of Classification Search
CPC .......... H01Q 1/243; H01Q 1/36; H01Q 1/405; H01Q 1/46; H01Q 5/364; H01Q 9/42; H04M 1/0202; H04M 1/026

USPC ....................................................... 455/575.7
See application file for complete search history.

(56) References Cited

U.S. PATENT DOCUMENTS

| | | | | |
|---|---|---|---|---|
| 6,323,812 | B1* | 11/2001 | Perrotta | H01Q 1/243 343/702 |
| 9,966,651 | B2* | 5/2018 | Lin | H01Q 9/42 |
| 2011/0304517 | A1* | 12/2011 | Fan | H01Q 1/243 427/105 |
| 2012/0038516 | A1* | 2/2012 | Hsieh | H01Q 9/42 343/702 |
| 2018/0309194 | A1* | 10/2018 | Wang | H01Q 1/273 |
| 2020/0036235 | A1* | 1/2020 | Lee | H01Q 1/245 |
| 2021/0071837 | A1* | 3/2021 | Owoc | F21V 31/005 |

* cited by examiner

*Primary Examiner* — Tan H Trinh
(74) *Attorney, Agent, or Firm* — LIN & ASSOCIATES INTELLECTUAL PROPERTY, INC.

(57) ABSTRACT

A back cover with an antenna element includes a cover body having a main portion, and an antenna element. A periphery of the main portion protrudes frontward to form a peripheral wall. The cover body is further equipped with a magnetic part. The antenna element is assembled in the cover body. The antenna element has a base portion, a connecting portion, a first extension portion and a second extension portion extended upward from the base portion. The first extension portion is disposed adjacent to one side of the peripheral wall of the cover body. The second extension portion is adjacent to the first extension portion. A length of the first extension portion is longer than a length of the second extension portion. A connecting portion is connected between the first extension portion and a top end of the second extension portion.

19 Claims, 2 Drawing Sheets

BACK COVER WITH AN ANTENNA ELEMENT

CROSS-REFERENCE TO RELATED APPLICATION

This application claims the priorities of U.S. provisional patent application No. 63/116,995, filed on Nov. 23, 2020, which is incorporated herewith by reference.

BACKGROUND OF THE INVENTION

1. Field of the Invention

The present invention generally relates to a back cover with an antenna element, and more particularly to a back cover with an antenna element which is applied to a smart phone and is capable of enhancing total radio frequency power of the smart phone.

2. The Related Art

Conventionally, a smart phone is designed to use a 4G (The Fourth Generation) mobile communication technology or a LTE (Long Term Evolution) technology. When the smart phone uses the 4G technology or the LTE technology, a usage frequency band of the smart phone is able to be 836.5 MHz. When the usage frequency band of the smart phone is 836.5 MHz, total radio frequency power of the smart phone is 15.8 dBm, and when a back cover is installed to the smart phone, the total radio frequency power of the smart phone with the back cover is 15.0 dBm, that is to say, the total radio frequency power of the smart phone with the back cover has a decrease of 0.8 dBm. Consequently, a communication efficiency of the smart phone is affected.

Therefore, it is necessary to provide a back cover with an antenna element applied to a smart phone, and the back cover with the antenna element is capable of enhancing total radio frequency power of the smart phone.

SUMMARY OF THE INVENTION

An object of the present invention is to provide a back cover with an antenna element assembled to a smart phone. The back cover with the antenna element includes a cover body having a main portion, and an antenna element. A periphery of the main portion protrudes frontward to form a peripheral wall. The cover body is further equipped with a magnetic part. The antenna element is assembled in the cover body. The antenna element has a base portion, a connecting portion, a first extension portion and a second extension portion extended upward from the base portion. The base portion is a rectangle shape. The first extension portion is formed by virtue of a top end of an external edge of the base portion extending towards the second extension portion and further extending upward. The second extension portion is extended upward from a top edge of the base portion. The external edge of the base portion is perpendicular to the top edge of the base portion. The external edge of the base portion is shorter than the top edge of the base portion. The first extension portion is disposed adjacent to one side of the peripheral wall of the cover body. The second extension portion is adjacent to the first extension portion. A length of the first extension portion is longer than a length of the second extension portion. A connecting portion is connected between the first extension portion and a top end of the second extension portion.

Another object of the present invention is to provide a back cover with an antenna element assembled to a smart phone. The back cover with the antenna element includes a cover body having a main portion, and an antenna element. A periphery of the main portion protrudes frontward to form a peripheral wall. The cover body is further equipped with a magnetic part. The antenna element is assembled in the cover body. The antenna element has a base portion, a connecting portion, a first extension portion and a second extension portion extended upward from a top edge of the base portion. The first extension portion is parallel with and spaced from the second extension portion. The first extension portion is disposed adjacent to one side of the peripheral wall of the cover body. The second extension portion is adjacent to the first extension portion. A length of the first extension portion is longer than a length of the second extension portion. The connecting portion is connected between an upper portion of an inner side edge of the first extension portion and a top end of the second extension portion. An outer side edge of the first extension portion is parallel with the inner side edge of the first extension portion. The outer side edge of the first extension portion is flush with an external edge of the base portion. The external edge of the base portion is perpendicular to the top edge of the base portion.

Another object of the present invention is to provide a back cover with an antenna element assembled to a smart phone. The back cover with the antenna element includes a cover body having a main portion, and an antenna element. A periphery of the main portion protrudes frontward to form a peripheral wall. The cover body is further equipped with a magnetic part. The antenna element is assembled in the cover body. The antenna element is disposed between one side of the peripheral wall of the cover body and the magnetic part. The antenna element has a base portion, a connecting portion, a first extension portion and a second extension portion extended upward from a top edge of the base portion. The first extension portion is parallel with and spaced from the second extension portion. The first extension portion is disposed adjacent to the one side of the peripheral wall of the cover body. The second extension portion is adjacent to the first extension portion. A length of the first extension portion is longer than a length of the second extension portion. The connecting portion is connected between an upper portion of an inner side edge of the first extension portion and a top end of the second extension portion. An outer side edge of the first extension portion is parallel with the inner side edge of the first extension portion. The outer side edge of the first extension portion is flush with an external edge of the base portion. The external edge of the base portion is perpendicular to the top edge of the base portion. The external edge of the base portion is shorter than the top edge of the base portion.

As described above, the back cover body with the antenna element is applied to the smart phone and is capable of enhancing total radio frequency power of the smart phone.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
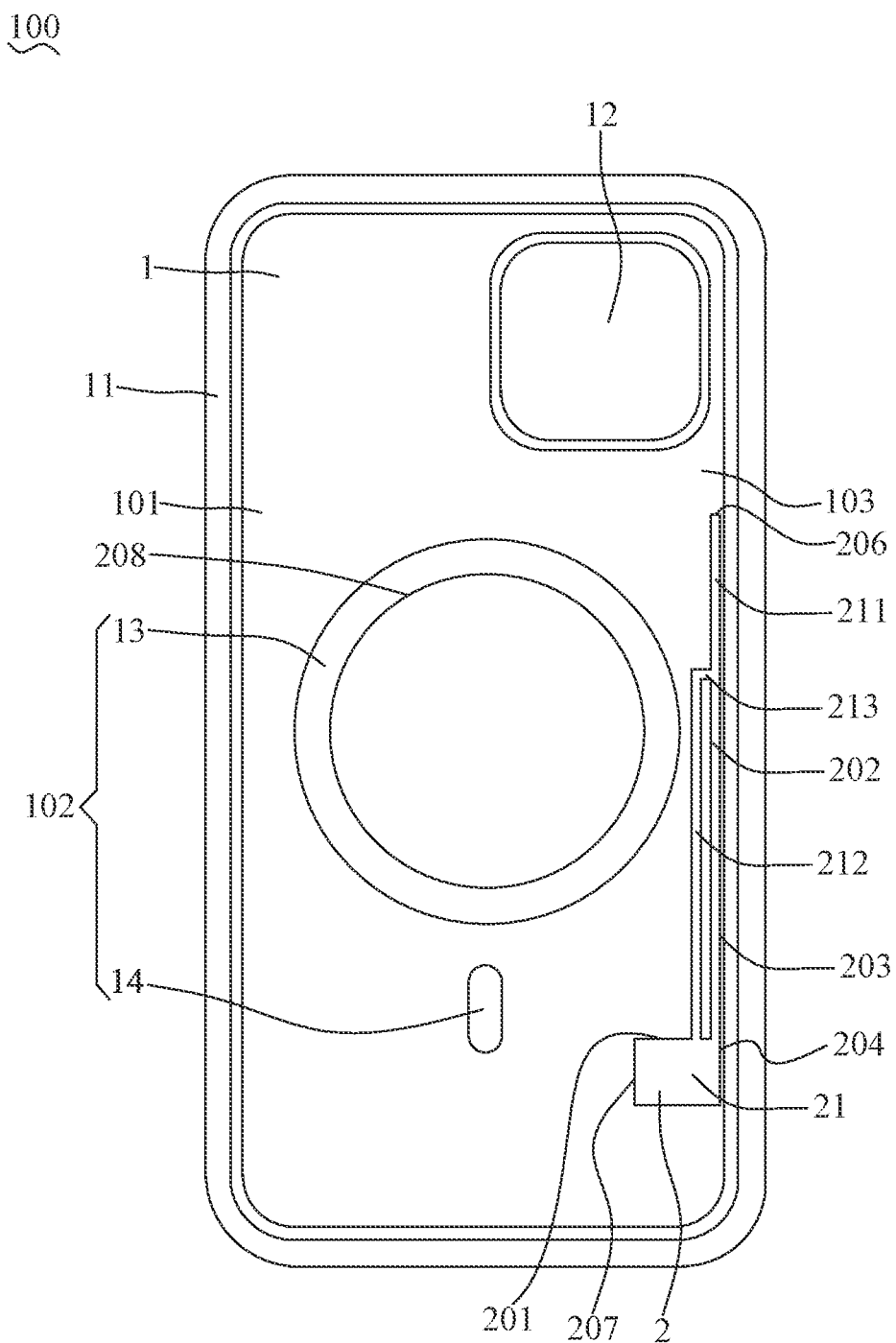
FIG. 1 is a front view of a back cover with an antenna element in accordance with the present invention.
Figure 2:
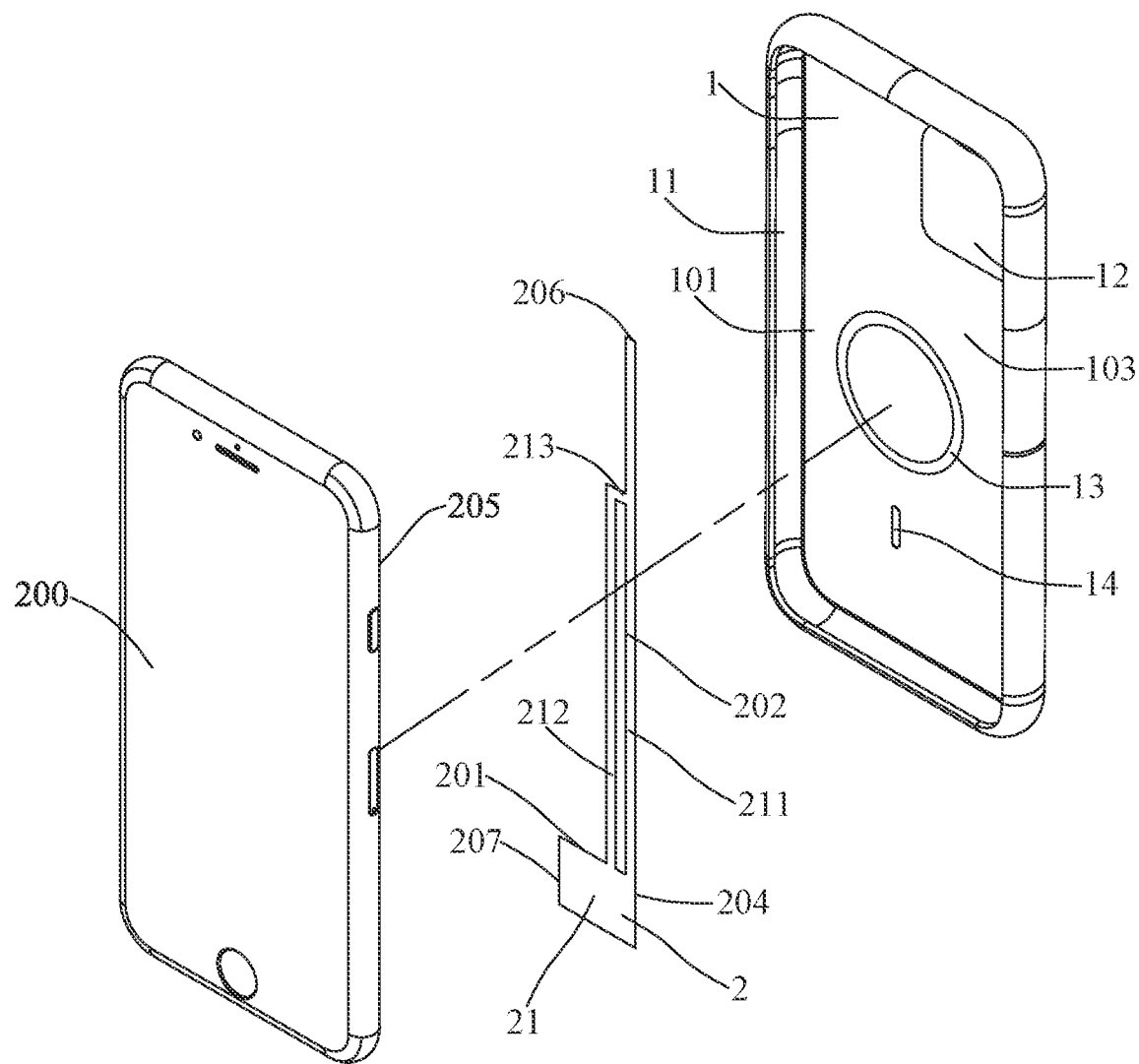
FIG. 2 is an exploded view showing that the back cover, the antenna element and a smart phone in accordance with the present invention.

With reference to FIG. 1 and FIG. 2, a back cover 100 with an antenna element 2 in accordance with the present invention is shown. The back cover 100 with the antenna element 2 is applied to the smart phone 200. The back cover 100 with the antenna element 2 is assembled to and is cooperated with the smart phone 200. The back cover 100 with the antenna element 2 includes a cover body 1 and the antenna element 2.

With reference to FIG. 2, a direction of the cover body 1 moving towards the smart phone 200 is defined as a frontward direction. The cover body 1 is assembled frontward to a rear of the smart phone 200. The cover body 1 is assembled with the rear of the smart phone 200. The cover body 1 has a main portion 101 which is shown as a rectangular board shape. A periphery of the main portion 101 of the cover body 1 protrudes frontward to form a peripheral wall 11. The main portion 101 of the cover body 1 is assembled to a rear surface 205 of the smart phone 200. The peripheral wall 11 is combined with and surrounds a periphery of the smart phone 200, so that the cover body 1 is assembled to the rear of the smart phone 200 tightly.

With reference to FIG. 1 and FIG. 2, the antenna element 2 is assembled in the cover body 1. In one situation, the antenna element 2 is glued on a front surface 103 of the main portion 101 of the cover body 1 with an adhesive. The antenna element 2 is exposed to the front surface 103 of the cover body 1. In another situation, the antenna element 2 is embedded in the main portion 101 of the cover body 1. The antenna element 2 is formed in the cover body 1 by an integral injection molding technology.

A material of the antenna element 2 is a flexible printed circuit board (FPC). The antenna element 2 has a base portion 21. Two portions of an edge of the base portion 21 extend upward to form a first extension portion 211 and a second extension portion 212, respectively. The first extension portion 211 is parallel with and spaced from the second extension portion 212. A length of the first extension portion 211 is longer than a length of the second extension portion 212. The first extension portion 211 extends beyond a top end of the second extension portion 212. The antenna element 2 further has a connecting portion 213 connected between the first extension portion 211 and the second extension portion 212.

Specifically, the base portion 21 is a rectangle shape. The first extension portion 211 and the second extension portion 212 are extended upward from a top edge 201 of the base portion 21. The top edge 201 straightly extends along a longitudinal direction. The first extension portion 211 and the second extension portion 212 are straightly extended upward from the top edge 201 and extend along a vertical direction. The first extension portion 211 and the second extension portion 212 are formed at the top edge 201 of the base portion 21. The first extension portion 211 is extended upward from one side of the top edge 201 of the base portion 21. The second extension portion 212 is adjacent to the first extension portion 211. The second extension portion 212 is extended upward from the other side of the top edge 201 of the base portion 21. The first extension portion 211 and the second extension portion 212 are perpendicular to the top edge 201 of the base portion 21. The connecting portion 213 is perpendicularly connected between an upper portion of an inner side edge 202 of the first extension portion 211 and a top end of the second extension portion 212.

An outer side edge 203 of the first extension portion 211 is parallel with the inner side edge 202 of the first extension portion 211. The outer side edge 203 of the first extension portion 211 parallel with the inner side edge 202 of the first extension portion 211 and away from the second extension portion 212 is flush with an external edge 204 of the base portion 21. The external edge 204 of the base portion 21 is connected with and is located under the outer side edge 203 of the first extension portion 211. That is to say, the first extension portion 211 is formed by virtue of a top end of the external edge 204 of the base portion 21 extending towards the second extension portion 212 and further extending upward. The external edge 204 of the base portion 21 is perpendicular to the top edge 201 of the base portion 21. The external edge 204 of the base portion 21 is shorter than the top edge 201 of the base portion 21. Each of the first extension portion 211, the second extension portion 212 and the connecting portion 213 is shown as an elongated slice shape.

A position of the antenna element 2 in the main portion 101 of the cover body 1 is disposed corresponding to a position of an internal antenna unit (not shown) of the smart phone 200. The first extension portion 211 is disposed adjacent to one side of the peripheral wall 11 of the cover body 1. Specifically, the first extension portion 211 is provided adjacent to a right side of the peripheral wall 11 seen from a front view.

An upper portion of one side of the cover body 1 defines an opening 12 penetrating through the cover body 1 in the longitudinal direction. An upper portion of a right side of the cover body 1 defines the opening 12 penetrating through the cover body 1 in the longitudinal direction and seen from the front view. The opening 12 is opened at the upper portion of the right side of the cover body 1, and the opening 12 is corresponding to a camera lens (not shown) of the smart phone 200 which is exposed from the rear surface 205 of the smart phone 200. The cover body 1 is further equipped with a magnetic part 102. The magnetic part 102 includes a first magnetic element 13 and a second magnetic element 14. The first magnetic element 13 is shown as a circular ring shape and is disposed in a middle position of the cover body 1. The first magnetic element 13 is disposed in a middle of the front surface 103 of the main portion 101 of the cover body 1. Specifically, the first magnetic element 13 includes a plurality of magnets arranged as the circular ring shape. The second magnetic element 14 is disposed under the first magnetic element 13. The second magnetic element 14 is rectangular. The first magnetic element 13 and the second magnetic element 14 are both corresponding to a wireless charging board (not shown).

The first magnetic element 13 and the second magnetic element 14 are able to be attracted with a magnetic element (not shown) of the wireless charging board, so that the cover body 1 is able to be attracted to the wireless charging board, and a battery (not shown) in the smart phone 200 is able to be aligned with a wireless charging unit (not shown) in the wireless charging board by a magnetic attraction location between the battery in the smart phone 200 and the wireless charging unit in the wireless charging board, so that the wireless charging board is able to wirelessly charge the smart phone 200 assembled in the cover body 1.

The antenna element 2 is disposed between the one side of the peripheral wall 11 of the cover body 1 and the first magnetic element 13 of the magnetic part 102. The antenna element 2 is arranged between the right side of the peripheral wall 11 and the first magnetic element 13, and the antenna element 2 is located below the opening 12. The top edge 201 of the base portion 21 of the antenna element 2 is aligned with a lower portion of the second magnetic element 14 along a horizontal direction. The connecting portion 213 of the antenna element 2 is located beside an upper portion of the first magnetic element 13. An uppermost edge 206 of the first extension portion 211 of the antenna element 2 is located above a top of the first magnetic element 13. A distance between an internal edge 207 of the base portion 21 of the antenna element 2 and a center portion of the front surface 103 of the main portion 101 of the cover body 1 along the horizontal direction is shorter than a distance between an interior edge 208 of the first magnetic element 13 and the center portion of the front surface 103 of the main portion 101 of the cover body 1 along the horizontal direction.

When the smart phone 200 uses 4G (The Fourth Generation) mobile communication technology or a LTE (Long Term Evolution) technology, and usage frequency bands used by the smart phone 200 are Band 5 (836.5 MHz) and Band 7 (2535 MHz), total radio frequency power of the smart phone 200 which is tested is 15.8 (dBm) and 11.3 (dBm), respectively, and when the smart phone 200 is installed with the back cover 100 without the antenna element 2, the total radio frequency power of the smart phone 200 in the back cover 100 without the antenna element 2 which is tested again is 15.0 (dBm) and 11.6 (dBm), respectively, the overall total radio frequency power is decreased.

When the smart phone 200 is installed with the back cover 100 with the antenna element 2, and the usage frequency bands used by the smart phone 200 in the back cover 100 with the antenna element 2 are the Band 5 (836.5 MHz) and the Band 7 (2535 MHz), after the smart phone 200 installed to the back cover 100 with the antenna element 2 is tested, the total radio frequency power of the smart phone 200 in the back cover 100 with the antenna element 2 is 15.8 (dBm) and 13.9 (dBm), respectively, compare the total radio frequency power of the smart phone 200 or the smart phone 200 in the back cover 100 without the antenna element 2 and the total radio frequency power of the smart phone 200 in the back cover 100 with the antenna element 2, the total radio frequency power of the smart phone 200 in the back cover 100 with the antenna element 2 has a increase of 0.8 (dBm) and has a increase of 2.3 (dBm).

As described above, the back cover 100 with the antenna element 2 is applied to the smart phone 200 and is capable of enhancing the total radio frequency power of the smart phone 200.

What is claimed is:

1. A back cover with an antenna element assembled to a smart phone, comprising:
    a cover body having a main portion, a periphery of the main portion protruding frontward to form a peripheral wall, the cover body being further equipped with a magnetic part; and
    an antenna element assembled in the cover body, the antenna element having a base portion, a connecting portion, a first extension portion and a second extension portion extended upward from the base portion, the base portion being a rectangle shape, the first extension portion being formed by virtue of a top end of an external edge of the base portion extending towards the second extension portion and further extending upward, the second extension portion being extended upward from a top edge of the base portion, the external edge of the base portion being perpendicular to the top edge of the base portion, the external edge of the base portion being shorter than the top edge of the base portion, the first extension portion being disposed adjacent to one side of the peripheral wall of the cover body, the second extension portion being adjacent to the first extension portion, a length of the first extension portion being longer than a length of the second extension portion, the connecting portion being connected between the first extension portion and a top end of the second extension portion.

2. The back cover with the antenna element as claimed in claim 1, wherein the antenna element is glued on a front surface of the main portion of the cover body with an adhesive.

3. The back cover with the antenna element as claimed in claim 1, wherein the antenna element is formed in the cover body by an integral injection molding technology.

4. The back cover with the antenna element as claimed in claim 1, wherein a material of the antenna element is a flexible printed circuit board.

5. The back cover with the antenna element as claimed in claim 1, wherein the magnetic part includes a first magnetic element, the first magnetic element is shown as a circular ring shape and is disposed in a middle position of the cover body.

6. The back cover with the antenna element as claimed in claim 5, wherein the first magnetic element includes a plurality of magnets arranged as the circular ring shape.

7. The back cover with the antenna element as claimed in claim 5, wherein the magnetic part includes a second magnetic element, the second magnetic element is disposed under the first magnetic element.

8. The back cover with the antenna element as claimed in claim 5, wherein the antenna element is disposed between the one side of the peripheral wall of the cover body and the first magnetic element.

9. The back cover with the antenna element as claimed in claim 5, wherein the magnetic part includes a second magnetic element, the second magnetic element is rectangular.

10. The back cover with the antenna element as claimed in claim 5, wherein the connecting portion of the antenna element is located beside an upper portion of the first magnetic element.

11. The back cover with the antenna element as claimed in claim 5, wherein an uppermost edge of the first extension portion of the antenna element is located above a top of the first magnetic element.

12. The back cover with the antenna element as claimed in claim 5, wherein a distance between an internal edge of the base portion of the antenna element and a center portion of a front surface of the main portion of the cover body along a horizontal direction is shorter than a distance between an interior edge of the first magnetic element and the center portion of the front surface of the main portion of the cover body along the horizontal direction.

13. The back cover with the antenna element as claimed in claim 1, wherein an upper portion of one side of the cover body defines an opening penetrating through the cover body in the longitudinal direction, and the opening is corresponding to a camera lens of the smart phone which is exposed from a rear surface of the smart phone.

14. The back cover with the antenna element as claimed in claim 1, wherein the connecting portion is perpendicularly connected between an upper portion of an inner side edge of the first extension portion and the top end of the second extension portion.

15. The back cover with the antenna element as claimed in claim 14, wherein an outer side edge of the first extension portion is parallel with the inner side edge of the first extension portion, the outer side edge of the first extension portion away from the second extension portion is flush with the external edge of the base portion.

16. The back cover with the antenna element as claimed in claim 1, wherein each of the first extension portion, the second extension portion and the connecting portion is shown as an elongated slice shape.

17. A back cover with an antenna element assembled to a smart phone, comprising:
   a cover body having a main portion, a periphery of the main portion protruding frontward to form a peripheral wall, the cover body being further equipped with a magnetic part; and
   an antenna element assembled in the cover body, the antenna element having a base portion, a connecting portion, a first extension portion and a second extension portion extended upward from a top edge of the base portion, the first extension portion being parallel with and spaced from the second extension portion, the first extension portion being disposed adjacent to one side of the peripheral wall of the cover body, the second extension portion being adjacent to the first extension portion, a length of the first extension portion being longer than a length of the second extension portion, the connecting portion being connected between an upper portion of an inner side edge of the first extension portion and a top end of the second extension portion, an outer side edge of the first extension portion being parallel with the inner side edge of the first extension portion, the outer side edge of the first extension portion being flush with an external edge of the base portion, the external edge of the base portion being perpendicular to the top edge of the base portion.

18. The back cover with the antenna element as claimed in claim 17, wherein the base portion is a rectangle shape.

19. A back cover with an antenna element assembled to a smart phone, comprising:
   a cover body having a main portion, a periphery of the main portion protruding frontward to form a peripheral wall, the cover body being further equipped with a magnetic part; and
   an antenna element assembled in the cover body, the antenna element being disposed between one side of the peripheral wall of the cover body and the magnetic part, the antenna element having a base portion, a connecting portion, a first extension portion and a second extension portion extended upward from a top edge of the base portion, the first extension portion being parallel with and spaced from the second extension portion, the first extension portion being disposed adjacent to the one side of the peripheral wall of the cover body, the second extension portion being adjacent to the first extension portion, a length of the first extension portion being longer than a length of the second extension portion, the connecting portion being connected between an upper portion of an inner side edge of the first extension portion and a top end of the second extension portion, an outer side edge of the first extension portion being parallel with the inner side edge of the first extension portion, the outer side edge of the first extension portion being flush with an external edge of the base portion, the external edge of the base portion being perpendicular to the top edge of the base portion, the external edge of the base portion being shorter than the top edge of the base portion.

* * * * *